United States Patent
Voyer et al.

(10) Patent No.: US 8,634,824 B2
(45) Date of Patent: Jan. 21, 2014

(54) METHOD FOR UPDATING A MONITORING LIST OF INFORMATION IDENTIFYING CELLS TRANSFERRED BY A BASE STATION OF A WIRELESS TELECOMMUNICATION NETWORK IN A CELL MANAGED BY THE BASE STATION

(75) Inventors: Nicolas Voyer, Rennes Cedex (FR); Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 1216 days.

(21) Appl. No.: 12/049,853

(22) Filed: Mar. 17, 2008

(65) Prior Publication Data

US 2008/0233949 A1     Sep. 25, 2008

(30) Foreign Application Priority Data

Mar. 19, 2007     (EP) ..................................... 07005575

(51) Int. Cl.
 *H04W 24/00* (2009.01)
(52) U.S. Cl.
 USPC ......................................... 455/424; 370/338
(58) Field of Classification Search
 USPC ......................................... 455/455; 370/338
 See application file for complete search history.

(56) References Cited

U.S. PATENT DOCUMENTS

| 7,848,758 B1 * | 12/2010 | Sill et al. ..................... 455/452.1 |
| 2002/0119779 A1 * | 8/2002 | Ishikawa et al. .............. 455/437 |
| 2005/0048974 A1 | 3/2005 | Kim et al. |

FOREIGN PATENT DOCUMENTS

WO     WO 99/27657     6/1999

\* cited by examiner

*Primary Examiner* — Marcos Batista
(74) *Attorney, Agent, or Firm* — Oblon, Spivak, McClelland, Maier & Neustadt, L.L.P.

(57) ABSTRACT

The present invention concerns a method for updating a monitoring list of information identifying cells transferred by a base station of a wireless telecommunication network in a cell managed by the base station, the monitoring list comprising information identifying cells which are neighbor of the cell managed by the base station. The base station:

receives a message comprising a path list comprising information identifying cells a mobile terminal has moved through, updates at least one monitoring list of information identifying cells according to the contents of the received path list, determines at least one modified path list from the content of the received path list, and for the or each modified path list:

determines another base station from the content of the modified path list, sends the modified path list to the other base station.

14 Claims, 5 Drawing Sheets

| 40 | $15_1$ | $15_2$ | $15_3$ | $15_4$ | $15_2$ | $15_5$ | $15_7$ | $15_1$ | $15_8$ |
| --- | --- | --- | --- | --- | --- | --- | --- | --- | --- |
| 41 | $15_2$ | $15_3$ | $15_4$ | $15_2$ | | | | | |
| 42 | $15_2$ | $15_5$ | $15_7$ | $15_1$ | | | | | |
| 43 | $15_1$ | $15_8$ | | | | | | | |
| 44 | $15_5$ | $15_7$ | $15_1$ | | | | | | |

| 60 | $15_1$ | $15_2$ | $15_3$ | $15_4$ | $15_2$ | $15_5$ | $15_7$ | $15_1$ | $15_8$ |
| --- | --- | --- | --- | --- | --- | --- | --- | --- | --- |
| 61 | $15_2$ | $15_3$ | $15_4$ | $15_2$ | $15_5$ | $15_7$ | $15_1$ | $15_8$ | |
| 62 | $15_4$ | $15_2$ | $15_5$ | $15_7$ | $15_1$ | $15_8$ | | | |
| 63 | $15_2$ | $15_5$ | $15_7$ | $15_1$ | $15_8$ | | | | |
| 64 | $15_5$ | $15_7$ | $15_1$ | $15_8$ | | | | | |
| 65 | $15_7$ | $15_1$ | $15_8$ | | | | | | |
| 66 | $15_1$ | $15_8$ | | | | | | | |

METHOD FOR UPDATING A MONITORING LIST OF INFORMATION IDENTIFYING CELLS TRANSFERRED BY A BASE STATION OF A WIRELESS TELECOMMUNICATION NETWORK IN A CELL MANAGED BY THE BASE STATION

The present invention relates to a method for updating a monitoring list of information identifying cells transferred by a base station of a wireless telecommunication network in a cell managed by the base station.

In wireless cellular telecommunication networks composed of plural base stations managing respectively at least one cell, a mobile terminal located in a cell can establish or receive or continue a communication through the base station BS which manages the cell in which mobile terminal is located.

Each base station transfers in each cell it manages a monitoring list comprising information identifying other cells. The mobile terminal monitors the signals transferred in these cells and sends measurement reports to the base station which manages the cell in which the mobile terminal is located. The measurement reports contains information about the quality of received signals and are reported either periodically or upon detection of a predefined type of event. Such event can be detected when the quality values of different signals are crossing each other, or crossing a predefined threshold value. Such event is useful to detect a handover situation where the communication should be transferred via another base station.

When the mobile terminal is in communication with a remote telecommunication device through the base station, the network can decide, according to the measurement report, to proceed to a handover procedure of the communication, i.e. enabling the continuation of the communication through another base station.

Unfortunately, the number of cells to be scanned and measured by the mobile terminal is potentially big. The time and the physical resource available at the mobile terminal side to realise precise measurements of received radio levels is limited. Also, periodical reporting of too many quality values consumes signalling capacity in the uplink channel. Such reporting thus either take time and brings undesired latency in handover procedure or consumes bandwidth in the uplink channel, which can not be used for useful data.

The base station should then limit the content of the monitoring list comprising information identifying other cells to the one which are neighbour of the cell or cells it manages in order to enable the mobile terminal to focus its measurement time and resource to the measuring and reporting the quality of signals of cells which really matter to future smooth handover.

The problem with the above mentioned limitation of the content of the monitoring list of neighbour cells is that it relies on a priori knowledge of neighbour cell lists. This monitoring list is determined from well-known optimisation techniques, which unfortunately rely on prediction tools, such as radio propagation prediction tools.

Radio propagation prediction tools have typically a limited accuracy, and requires quite intensive computer simulations.

Each time a cell is added or removed in the wireless cellular telecommunication network, the neighbouring conditions are changed, and a new optimisation has to be performed to get updated monitoring lists of neighbour cells. The maintenance of the wireless cellular telecommunication network is a tough task, which has to be tightly coordinated.

The aim of the invention is therefore to propose a method and a device which make it possible to propose a solution which requires no prior radio planning, and which can determine accurate monitoring lists of neighbour cells with limited computing resources.

To that end, the present invention concerns a method for updating at least one monitoring list of information identifying cells transferred by a base station of a wireless telecommunication network in at least one cell managed by the base station, the at least one monitoring list comprising information identifying cells which are neighbour of the cell managed by the base station in which the at least one monitoring list is transferred, characterised in that the method comprises the steps executed by the base station of:

receiving a message comprising a path list comprising information identifying cells a mobile terminal has moved through,
  updating at least one monitoring list of information identifying cells according to the contents of the received path list?
  determining at least one modified path list from the content of the received path list,
  and for the or each modified path list:
  determining another base station from the content of the modified path list,
  sending the modified path list to the other base station.

The present invention concerns also a device for updating at least one monitoring list of information identifying cells transferred by a base station in at least one cell managed by the base station, the at least one monitoring list comprising information identifying cells which are neighbour of the cell managed by the base station in which the at least one monitoring list is transferred, characterised in that the device is included in the base station and comprises:

means for receiving a message comprising a path list comprising information identifying cells a mobile terminal has moved through,
  means for updating at least one monitoring list of information identifying cells according to the contents of the received path list?
  determining at least one modified path list from the content of the received path list,
  means for determining at least one other base station from the content of the modified path list for the or each modified path list,
  means for sending the modified path list to the other or each other base station for the or each modified path list.

Thus, it is no more necessary to have any radio planning. By using information identifying cells a mobile terminal has moved through, it is possible to be aware of any new cell which is neighbour of one cell managed by the base station.

Furthermore, at least one other base station can be aware of any new cell which is neighbour of the cell managed by the other base station.

According to a particular feature, the base station:
  identifies in the path list an information identifying one cell managed by the base station,
  identifies in the path list an information identifying another cell, the information identifying the other cell which directly follows in the path list the information identifying the cell managed by the base station,
  updates the value of a counter which is associated to the cell managed by the base station and the other cell,
  and the monitoring list of information identifying cells transferred by the base station in the cell managed by the base station is updated according to the value of the counter.

Thus, it is possible to determine if the other cell is a likely cell to which a mobile terminal is likely to enter when leaving the cell managed by the base station. As the counter reflects the information contained in many successive received messages corresponding to numerous mobile terminals, it is possible to detect any modification of typical neighbouring conditions between cells that would results from a modification of the radio propagation conditions.

According to a particular feature, the base station:
identifies in the path list an information identifying one cell managed by the base station,
identifies in the path list an information identifying another cell, the information identifying the other cell which directly precedes in the path list the information identifying the cell managed by the base station,
updates the value of a counter which is associated to the cell managed by the base station and the other cell,
and the monitoring list of information identifying cells transferred by the base station in the cell managed by the base station is updated according to the value of the counter.

Thus, it is possible to determine if the other cell is a likely cell that a mobile terminal is likely to leave when entering the cell managed by the base station. As the counter reflects the information contained in many successive received messages corresponding to numerous mobile terminals, it is possible to detect any modification of typical neighbouring conditions between cells that would results from a modification of the radio propagation conditions.

According to a particular feature, the monitoring list of information identifying cells transferred by the base station in the other cell is updated according to the value of the counter if the other cell is managed by the base station.

Thus, multiple monitoring lists transferred in cells managed by the base station are updated at once after reception of a single message. The number of messages is reduced.

According to a particular feature, the base station
selects a first information identifying a first cell managed by the base station in the received path list,
selects a second information identifying a second cell in the received path list,
selects each information identifying a cell comprised between the first and second information in the receiving path list,
and the modified path list is composed of the first information, each information between first and second information, and the second information.

Thus, the determination of the modified path list is simple to realize, as it consists in cutting the initially ordered path list in a sub list, which does not affect the order of cells the mobile has moved through.

According to a particular feature, the first information selected is the first information, in the received path list, identifying a cell managed by the base station that is followed, in the received path list, by an information identifying a cell that is not managed by the base station.

Thus, information identifying cells managed by the base station which precedes the first information, in the received path list, identifying a cell managed by the base station that is followed, in the received path list, by an information identifying a cell that is not managed by the base station is not part of the modified path list. Such information only affects neighbouring relationships between cells managed by the base station and need not to be transferred to other base station. The signalling is minimised.

According to a particular feature, the second information selected is the information identifying a cell of the base station that first follows, in the received path list, the first information selected.

Thus, there is no chance that the base station further receives a modified path list from other base station, that would be determined from the determined modified path list with a similar method. A transition between cells observed in the received path list will be counted only once. The processing of the base station is minimised. The signalling between base stations is also minimised.

According to a particular feature, plural modified path lists are determined and at least one second information selected for determining a modified path list is the first information for determining a next modified path list.

Thus, the processing of the received path list throughout all base stations will be handled in a parallel way, and take less time. The monitoring lists can be updated faster.

In addition, in case the received path list describes a trajectory of a mobile terminal which contains loops, the base station will process such trajectory only once.

According to a particular feature, the second information is the last information of the received path list.

Thus, the determination of the modified path list is simple, and can be realised when it is not possible to determine a next modified path list.

According to a particular feature, the other base station is determined by
selecting a third information identifying a third cell in the modified path list, the third information being the information identifying a cell which directly follows the first information in the modified path list,
and the other base station is the base station which manages the cell identified by the third selected information.

Thus, the other base station can update the monitoring list upon observation that the mobile terminal leaved the cell managed by the base station, identified by the first information prior to entering the other cell managed by the other base station and identified by the third selected information.

According to a particular feature, the message comprising the path list of information identifying cells a mobile terminal has moved through is received from another base station of the wireless telecommunication network or from a server of the wireless telecommunication network, or from a mobile terminal.

Thus, the signalling of such list is made in a efficient way. The battery of mobile terminal can be saved as the message has to be transmitted only once by the mobile terminal. The processing capacity of the server can be saved as it transmits the path list only once.

According to a particular feature, the other base station also executes the method and steps for updating at least one monitoring lists.

Thus, information contained in the modified path list can be treated by successive base stations, and the monitoring lists transferred in all cells identified in the received path list will be updated according to the path list that represents the list of cells the mobile terminal has moved through.

Each updated monitoring list better reflects the actual mobility conditions and typical radio neighbouring conditions between cells. The wireless telecommunication network requires no radio planning, nor complex schemes for detecting that the radio propagation conditions have changed.

According to still another aspect, the present invention concerns computer programs which can be directly loadable into a programmable device, comprising instructions or portions of code for implementing the steps of the methods according to the invention, when said computer programs are executed on a programmable device.

Since the features and advantages related to the computer programs are the same as those set out above related to the method and device according to the invention, they will not be repeated here.

The characteristics of the invention will emerge more clearly from a reading of the following description of an example of embodiment, the said description being produced with reference to the accompanying drawings, among which:

Figures 2, 4, 6:
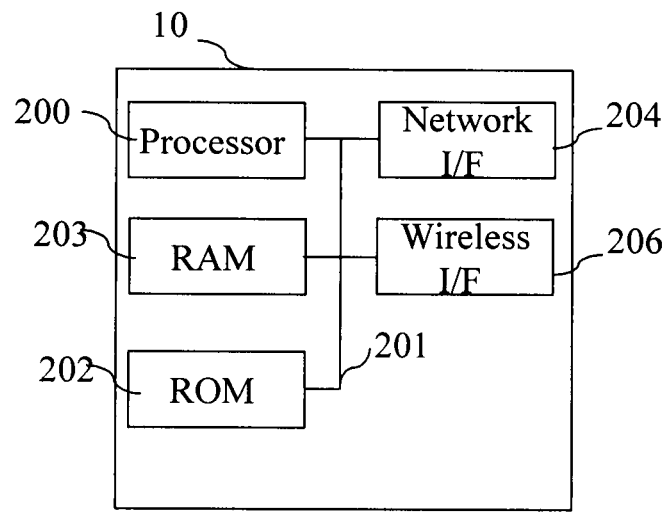
FIG. 2 is a block diagram of a base station according to the present invention.
FIG. 4 depicts the content of the messages transferred according to the first mode of realisation of the present invention.
Figure 5:
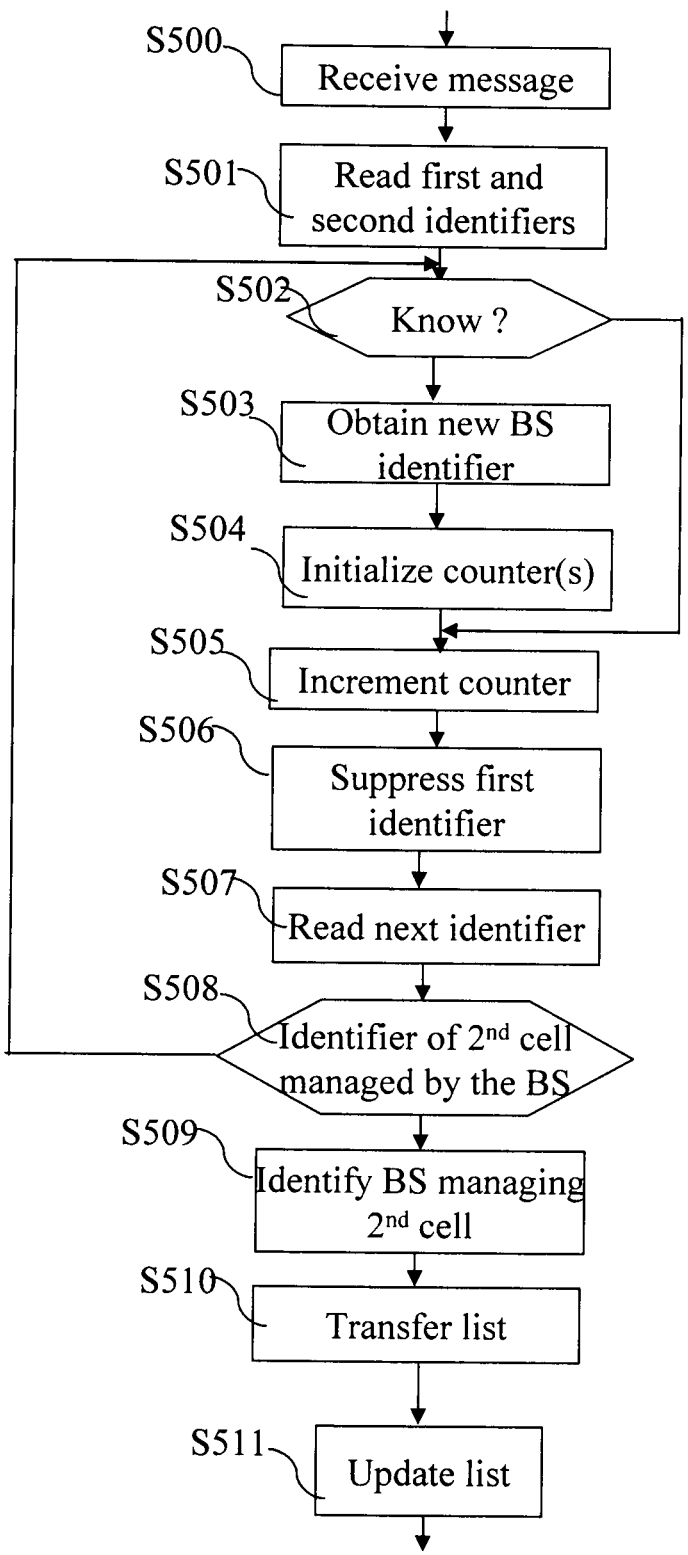

FIG. 5 discloses an algorithm executed by each base station according to a second mode of realisation of the present invention;

FIG. 6 depicts the content of the messages transferred according to the second mode of realisation of the present invention.

Figure 1:
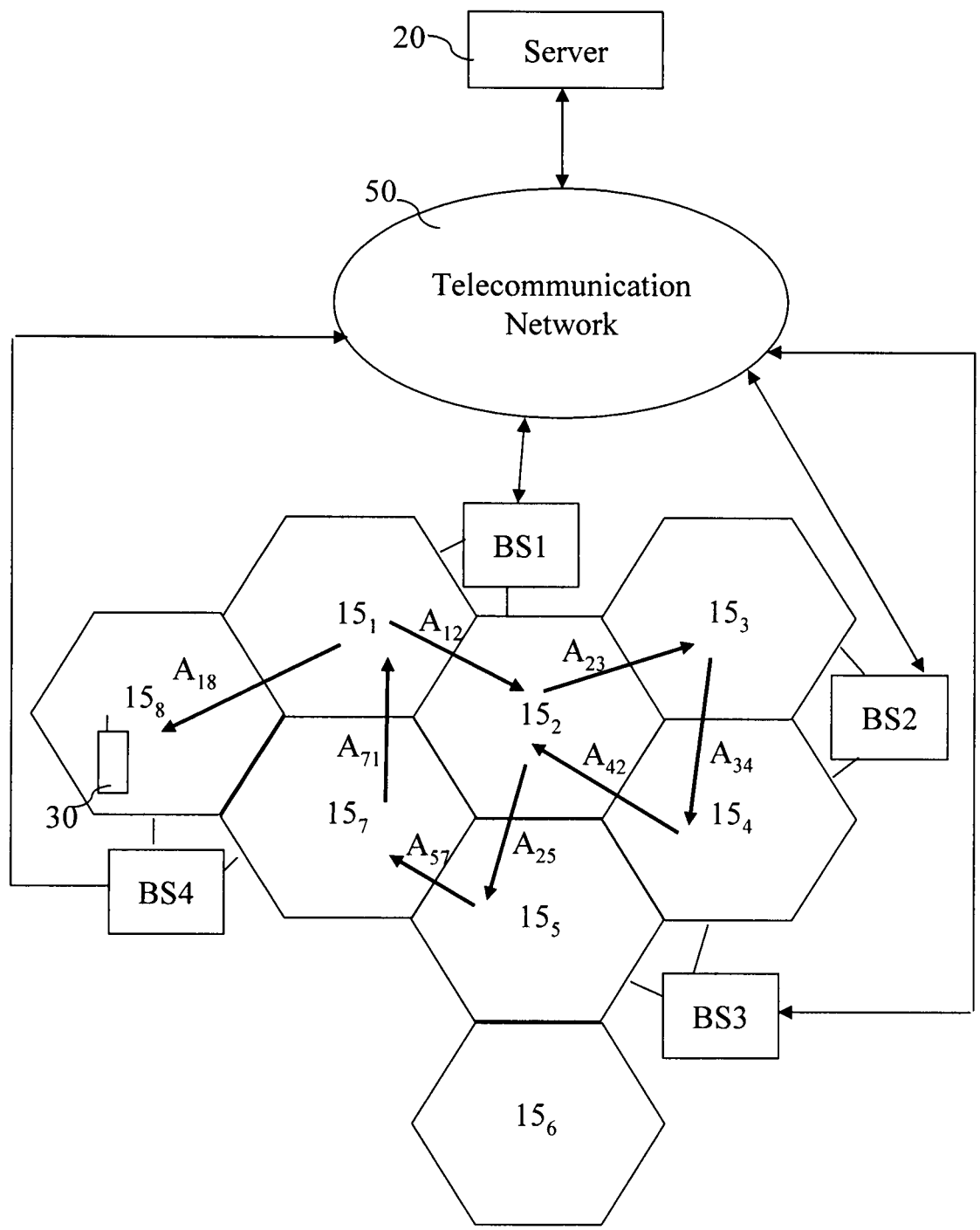
FIG. 1 is a first diagram representing the architecture of a mobile telecommunication network according to the present invention.

FIG. 1 is a first diagram representing the architecture of a mobile telecommunication network according to the present invention.

In the mobile telecommunication network, a server 20 is connected to a plurality of base stations BS1 to BS4 through a telecommunication network 50. The telecommunication network 50 is a dedicated wired network or a public network like a public switched network or an IP based network or a wireless network or an Asynchronous Transfer Mode network or a combination of above cited networks.

The telecommunication network 50 connects the base stations BS1 to BS4 together and enables the transfer of messages and of information between the base stations BS1 to BS4 or between the base stations BS1 to BS4 and the server 20 according to the present invention.

Each base station BS1 to BS4 is able to transfer and or receive data through at least one wireless area 15. Such wireless area 15 will be called hereinafter a cell 15 managed by the base station BS.

According to the example of the FIG. 1, the base station BS1 manages the cells $15_1$ and $15_2$, the base station BS2 manages the cells $15_3$ and $15_4$, the base station BS3 manages the cells $15_5$ and $15_6$ and the base station BS4 manages the cells $15_7$ and $15_8$.

The server 20 stores the information related to the base stations BS1 to BS4 of the mobile telecommunication network. The server 20 stores information identifying each cell 15 that each base station BS manages.

In the FIG. 1, only one server 20 is shown, but we can understand that a more important number of servers 20 can be used in the present invention.

In a similar way, only four base stations BS1 to BS4 and their respective cells 15 are shown, but we can understand that a more important number of base stations BS and cells 15 are used in the present invention.

In Long Term Evolution (LTE) network currently under discussion in 3GPP, the server 20 is named a Mobility Management Entity (MME). In General Packet Radio Service network, the server 20 is named a Serving GPRS Support Node (SGSN). In mobile IP network, the server 20 is named a Foreign Agent (FA) and in GSM network, the server 20 is named a Visitor Location Register (VLR).

In the FIG. 1, a mobile terminal 30 is shown. The mobile terminal 30 is located in the cell $15_8$ of the base station BS4.

Prior to be located in the cell $15_8$, the mobile terminal 30 successively moved from the cell $15_1$ to the cell $15_2$ as depicted by the arrow note $A_{12}$, moved from the cell $15_2$ to the cell $15_3$ as depicted by the arrow note $A_{23}$, moved from the cell $15_3$ to the cell $15_4$ as depicted by the arrow note $A_{34}$, moved from the cell $15_4$ to the cell $15_2$ as depicted by the arrow note $A_{42}$, moved from the cell $15_2$ to the cell $15_5$ as depicted by the arrow note $A_{25}$, moved from the cell $15_5$ to the cell $15_7$ as depicted by the arrow note $A_{57}$, moved from the cell $15_7$ to the cell $15_1$ as depicted by the arrow note $A_{71}$ and finally moved from the cell $15_1$ to the cell $15_8$ as depicted by the arrow note $A_{18}$.

When the mobile terminal 30 is located in a cell 15, the mobile terminal 30 can establish or receive or continue a communication through the base station BS which manages the cell 15 in which mobile terminal 30 is located or can receive a paging notification message.

The server 20 is in charge of keeping track of the location of the mobile terminal 30 in the wireless cellular telecommunication network, so as to be able to route paging notifications to the base stations BS which control at least a cell 15 of the Tracking Area in which the mobile terminal 30 is expected to be located in. Such paging notification can occur at various occasions, but mainly at the time that an incoming call has to be routed from the network down to the mobile terminal 30. Then, the base station 30 can send over the radio, a paging message that the mobile terminal 30 can listen to. Once the mobile terminal 30 has received the paging message, it can wake up and trigger signalling so as to accept the call.

The cells $15_1$ to $15_7$ are preferably comprised in the Tracking Area assigned to the mobile terminal 30.

When the mobile terminal 30 enters in a cell 15, as example the cell $15_8$, which does not belong to the tracking area it was currently belonging to, the mobile terminal 30 sends a Tracking Area Update message to the server 20 through the base station BS4 controlling the cell $15_8$ the mobile terminal 15 enters. The message comprises information identifying at least a part of the cells 15 the mobile terminal 30 has went through after the previously transferred Tracking Area Update message. In a preferred implementation, the message comprises information identifying the cell 15 in which the mobile terminal 30 is currently located. The server 20 is thus kept informed of which cell 15 the mobile terminal 30 is located in and is capable to determine a new tracking area which contains the cell 15 in which the mobile terminal 30 is located, and is capable to route paging indications for such mobile terminal 30 to each base station BS that controls one cell 15 belonging to that new tracking area.

It has to be noted here that, instead of sending a tracking area update message comprising information identifying at least a part of the cells 15 the mobile terminal 30 has went through, the mobile terminal sends a dedicated message, for example on a periodical basis, which comprises the information identifying the cells 15 the mobile terminal 30 has went through.

Each base station BS transfers in each cell 15 it manages, a monitoring list comprising information identifying other cells 15. The mobile terminal 30 monitors the signals transferred in these cells 15 and sends measurement reports to the base station BS which manages the cell 15 in which the mobile terminal 30 is located.

For example, when the mobile terminal 30 is in communication with a remote telecommunication device not shown in the FIG. 1 through a base station BS, that base station BS or the server 20 can decide, according to the measurement report, to proceed to a handover procedure of the communication, i.e. enabling the continuation of the communication through another base station BS.

FIG. 2 is a block diagram of a base station according to the present invention.

Figure 3A:
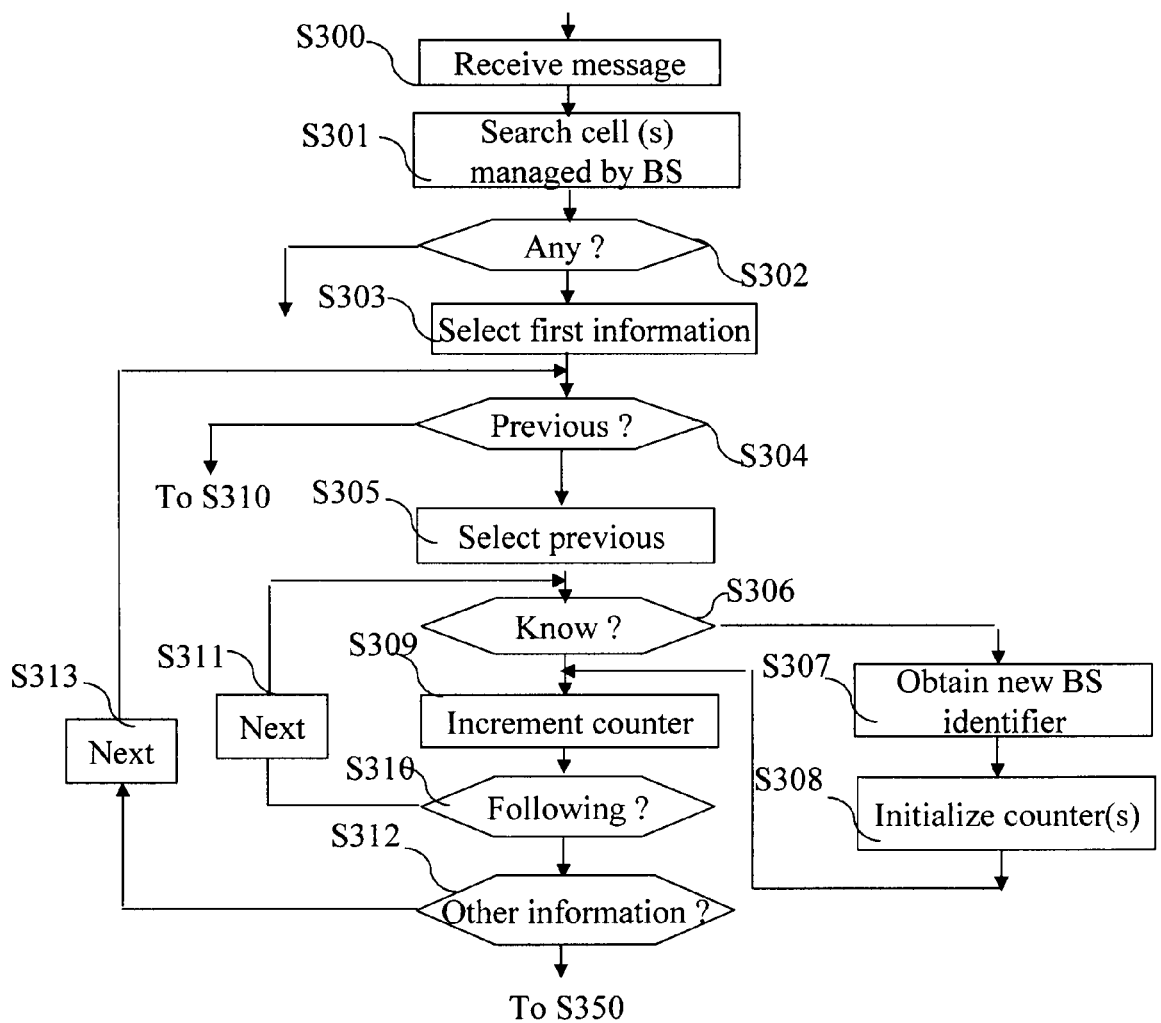
FIGS. 3a and 3b represent an algorithm executed by each base station according to a first mode of realisation of the present invention.
Figure 3B:
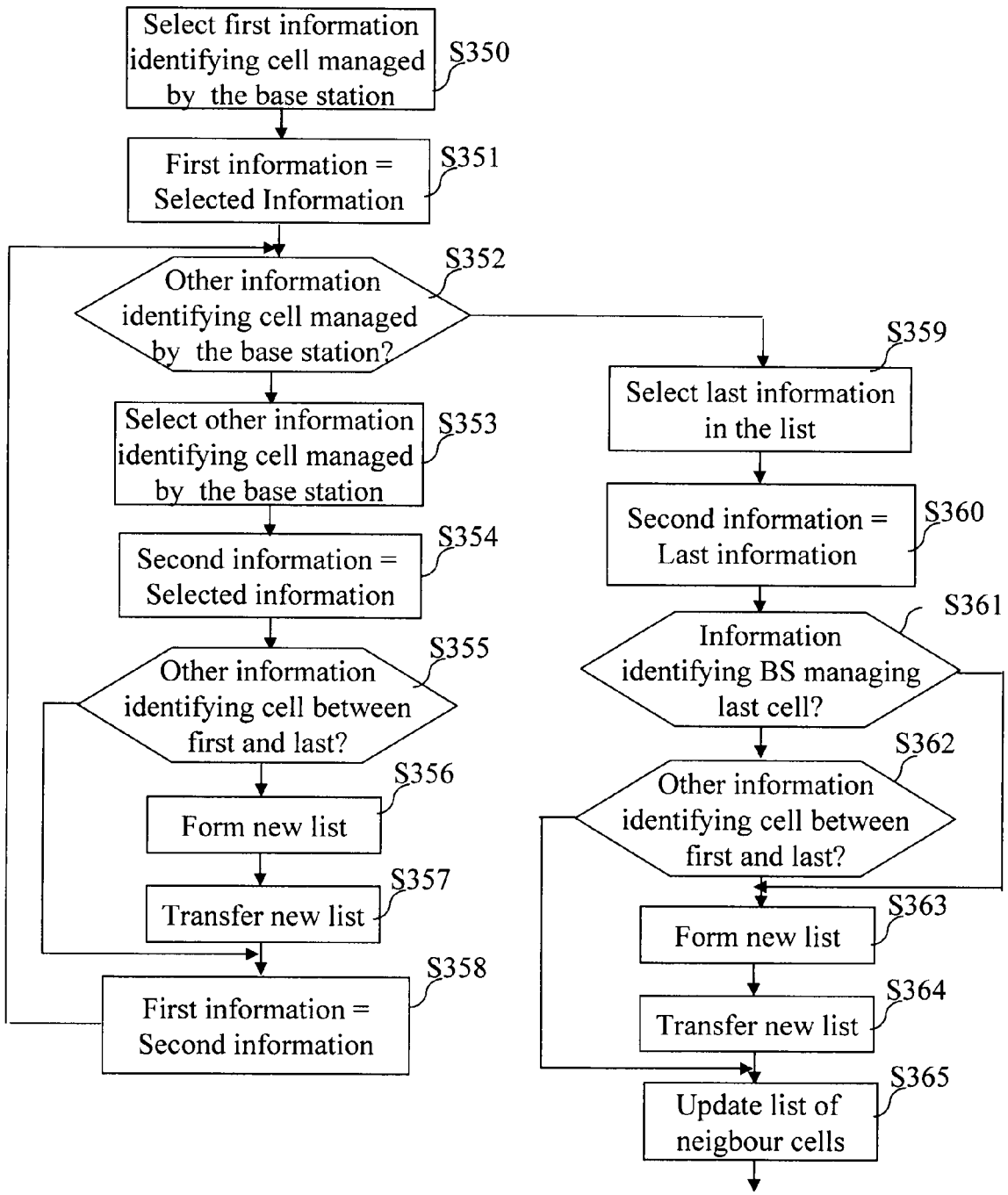

Each base station BS has, for example, an architecture based on components connected together by a bus 201 and a processor 200 controlled by the program as disclosed in the FIGS. 3a and 3b or the FIG. 5.

The bus links the processor 200 to a computer readable read only memory ROM 202, a computer readable random access memory RAM 203, a network interface 204 and a wireless interface 206.

The memory 203 contains registers intended to receive variables, information identifying of cells 15, like cells 15 which are known as neighbour of the cells 15 managed by the base station BS and the identifiers of the base stations BS which manage neighbour cells 15, the content of the messages transferred by the mobile terminal 30 or by other base stations BS or by the server 20, and the instructions of the program related to the algorithm as disclosed in the FIGS. 3a and 3b or the FIG. 5.

The processor 200 controls the operation of the network interface 204 and the wireless interface 206.

The read only memory 202 contains instructions of the programs related to the algorithm as disclosed in the FIGS. 3a and 3b or the FIG. 5, which are transferred, when the base station BS is powered on to the random access memory 203.

The base station BS is connected to the telecommunication network 50 through the network interface 204. As example, the network interface 204 is a DSL (Digital Subscriber Line) modem, or an ISDN (Integrated Services Digital Network) interface, etc. Through such interface, the base station BS exchanges information with the server 20 and the other base stations BS of the wireless cellular telecommunication network. The communications established or received by the mobile terminals 30 comprised in each cell 15 managed by the base station BS go through the network interface 204 and the wireless interface 206.

Through the wireless interface 206, the base station BS transfers monitoring lists of information identifying cells 15, receives, from the mobile terminal 30, measurement reports and messages comprising a path list comprising information identifying the cells 15 the mobile terminal 30 has went through.

FIGS. 3a and 3b represent an algorithm executed by each base station according to a first mode of realisation of the present invention.

The present algorithm is executed by the processor 200 of each base station BS.

At step S300, the processor 200 detects the reception of a message through the wireless interface 206 or through the network interface 204.

The received message is a message comprising a path list comprising information, preferably ordered according to the travel of the mobile terminal 30 through the cells 15 of the wireless telecommunication network, identifying at least a part of the cells 15 the mobile terminal 30 went through.

The path list is preferably transferred by the mobile terminal 30 to the server 20 in a Tracking Area Update message to the server 20 through the base station BS4 controlling the cell $15_8$ the mobile terminal 15 enters. The server 20 transfers the path list to the base station BS1 which manages the cell $15_1$ of which identification is ranked as the first in the path list. The path list is as the one disclosed in the line 40 of the FIG. 4.

It has to be noted here that, in a variant, the base station BS4 snoops the messages transferred by the mobile terminal 30 to the server 20 in order to directly obtain the path list of information identifying at least a part of the cells 15 that the mobile terminal 30 went through.

It has also to be noted here that, in a variant, the server 20 transfers the path list to the base station BS4 which manages the cell $15_8$ of which identification is ranked as the last in the path list.

In a variant, the path list is received from any other base station, like for example the base station BS4 via the network interface 204.

FIG. 4 depicts the content of the messages transferred according to the first mode of realisation of the present invention.

The line 40 comprises ordered information identifying the cells $15_1$, $15_2$, $15_3$, $15_4$, $15_2$, $15_5$, $15_7$, $15_1$ and $15_8$, which are comprised in the path list comprised in the message received at step S300.

At next step S301, the processor 200 searches, in the path list, information identifying at least one cell 15 the base station BS manages.

As example, the message is received by the base station BS1, the processor 200 identifies the cells $15_1$ and $15_2$ in the line 40 of the FIG. 4.

At next step S302, the processor 200 checks if there is any information identifying the cell $15_1$ or $15_2$ the base station BS manages.

If no information identifies the cell $15_1$ or $15_2$, the processor 200 returns to step S300 and waits the reception of a new message. Otherwise, the processor 200 moves to step S303.

At step S303, the processor 200 selects a first information identifying a cell 15 it manages in the path list. As example, the processor 200 selects the first information identifying a cell 15 it manages in the ordered path list, i.e. the information identifying the cell $15_1$.

A next step S304, the processor 200 checks if there is in the path list, a previous information identifying a cell 15 to the information selected at step S303.

If there is in the path list a previous information identifying a cell 15 to the information selected at step S303, the processor 200 moves to step S305. Otherwise, the processor 200 moves to step S310.

At step S310, the processor 200 checks if there is information identifying a cell 15 which follows in the path list the information selected at step S303 or S313.

If there is an information identifying a cell 15 which follows in the path list the information selected at step S303 or S313, the processor 200 moves to step S311. Otherwise, the processor 200 moves to step S312.

At step S311, the processor 200 selects the information identifying a cell 15 in the path list which follows the information selected at step S303 or S313 and moves to step S306.

At next step S306, the processor 200 checks if the information identifying a cell 15, selected at step S305 or S311, is known, i.e. if the information identifying a cell corresponds to a known neighbour cell 15 or to a cell 15 managed by the base station BS.

If the information identifying a cell 15 is not known, the processor 200 moves to step S307. Such case occurs when a new base station BS is included in the wireless telecommunication network or when the radio wave propagation conditions are modified. Otherwise, the processor 200 moves to step S308.

At step S307, the processor 200 commands the transfer of a message to the server 20 in order to obtain the identifier of the base station BS which manages the cell 15 selected at step S305 or S311 or reads it in the RAM memory 203 if the identifier of the base station BS which manages the cell 15 selected at step S305 or S311 is memorized.

At next step S308, the processor 200 memorises the identifier of the base station BS obtained at step S307 from the server 20 and initialises one counter Nij for each cell $15i$ controlled by the base station of the processor 200, which is intended to monitor the number of occurrences any mobile terminal 30 moves from the cell $15i$ controlled by the base station of the processor 200 to the cell $15j$ selected at step S305 or S311, and initialises one counter Nji for each cell $15i$ controlled by the base station of the processor 200, which is intended to monitor the number of occurrences any mobile terminal 30 moves from the cell $15j$ selected at step S305 or S311 to the cell $15i$ controlled by the base station of the processor 200.

At step S309, the processor 200 increments a counter $N_{ij}$ which is intended to monitor the number of occurrences any mobile terminal 30 moves from the cell $15_i$ selected at step S303 or S313 to the cell $15_j$ selected at step S311 if a following information identifying a cell is under process, or increments the counter $N_{ji}$ which is intended to monitor the number of occurrences any mobile terminal 30 moves from the cell $15_j$ selected at step S305 to the cell $15_i$ selected at step S303 or S313 if a previous information identifying a cell is under process and that previous information doesn't identifies a cell 15 managed by the base station BS. After that, the processor 200 moves to step S310.

According to the example shown line 40 of the FIG. 4, the processor 200 increments the counter $N_{12}$ which monitors the number of times any mobile terminal 30 moved from the cell $15_1$ to the cell $15_2$.

At step S312, the processor 200 checks if there is another information identifying a cell managed by the base station BS which is comprised in the path list received at step S300.

If there is another information identifying a cell managed by the base station BS which is comprised in the path list received at step S300, the processor 200 moves to step S313, selects the other information identifying a cell managed by the base station BS which is comprised in the path list and returns to step S304. Otherwise, the processor 200 moves to step S350.

According to the example of line 40 of the FIG. 4, the processor 200 selects the information identifying the cell $15_2$ and increments the counters $N_{23}$.

According to the example of line 40 of the FIG. 4, the processor 200 selects the information identifying the cell $15_2$, increments the counters $N_{42}$ and $N_{25}$.

According to the example of line 40 of the FIG. 4, the processor 200 selects the information identifying the cell $15_1$, increments the counters $N_{71}$, initialises the counter $N_{81}$, increments the counter $N_{81}$ and moves to step S350.

At step S350 of the FIG. 3b, the processor 200 of the base station BS1 selects the first information identifying a cell managed by the base station BS in the path list, i.e. the information identifying the cell $15_1$.

At next step S351, the processor 200 sets the first information identifying a cell managed by the base station BS in a modified path list to the information selected at step S350.

At next step S352, the processor 200 checks if there is another information identifying a cell managed by the base station BS comprised in the path list. If there is another information identifying a cell managed by the base station BS comprised in the path list received at step S300, the processor 200 moves to step S353. Otherwise, the processor 200 moves to step S359. According to the example of the line 40, the identifier of the cell $15_2$ is two times comprised in the path list and the identifier of the cell $15_1$ is another time comprised in the path list. The processor 200 moves to step S353.

At step S353, the processor 200 selects the other information identifying a cell managed by the base station BS comprised in the path list received at step S300 which is the closest from the information selected at step S351, i.e. the information identifying the cell $15_2$.

At next step S354, the processor 200 sets the second information identifying a cell managed by the base station BS in the modified path list to the information selected at step S353.

At next step S355, the processor 200 checks if there is at least one information identifying a cell 15 which is comprised, in the path list received at step S300, between the information selected at step S351 and S353.

If there is at least one information identifying a cell 15 which is comprised in the path list received at step S300 between the information selected at step S351 and S353, the processor 200 moves to step S356. Otherwise, the processor 200 moves to step S358. According to the example of line 40, as no information identifying a cell 15 which is comprised in the path list between the information selected at step S351 and S353, the processor 200 then moves to step S358.

At step S358, the processor 200 sets the first information identifying a cell managed by the base station BS in the modified path list to the second information identifying a cell managed by the base station BS in the modified path list and returns to step S352.

At step S352 already described, the processor 200 checks if there is another information identifying a cell managed by the base station BS comprised in the path list. According to the example of the line 40, the identifier of the cell $15_2$ is one more time comprised in the path list and the identifier of the cell $15_1$ is one time again comprised in the path list. The processor 200 moves to step S353.

At step S353, the processor 200 selects the other information identifying a cell managed by the base station BS comprised in the path list received at step S300 which is the closest from the information selected at step S358 i.e. the information identifying the cell $15_2$.

At next step S354, the processor 200 sets the second information identifying a cell managed by the base station BS in the new ordered list to information selected at step S353.

At next step S355, the processor 200 checks if there is at least one information identifying a cell 15 which is comprised in the path list received at step S300 between the information selected as the first and the second information in the modified path list.

According to the example of the line 40, the information identifying the cells $15_3$ and $15_4$ are comprised in the path list received at step S300 between the information $15_2$ selected as the first and the second information $15_2$.

The processor 200 moves then to step S356 and forms the modified path list. The modified path list comprises the first information, the information comprised between the information selected as the first and the second information and the second information. The information identifying the cells $15_2$, $15_3$, $15_4$ and $15_2$ comprised in the modified path list are disclosed line 41 of the FIG. 4. It has to be noted here that the modified path list preferably contains the identifier of the base station BS1 and the identifiers of base stations BS which were contained in the message received at step S350, if such identifiers were contained in the message received at step S350.

At next step S357, the processor 200 transfers the modified path list to the base station BS which manages the cell 15 identified by the information following the first information in the modified path list, i.e. the base station BS2, which manages the cell $15_3$.

After that, the processor 200 moves to step S358, sets the first information identifying a cell managed by the base station BS in the modified path list to the second information identifying a cell managed by the base station BS in the modified path list. The first information identifying a cell managed by the base station BS in the modified path list is set to information identifying the cell $15_2$.

The processor 200 returns then to step S352, executes the steps S352 and S353, sets the second information identifying a cell managed by the base station BS in the modified path list to the information identifying the cell $15_1$.

The processor 200 executes the step S355, forms at step S356 the modified path list. The modified path list comprises the first information selected as the first information in the modified path list, the information comprised between the information selected as the first and the second information in the modified path list and the information selected as the second information in the modified path list. The information identifying the cells $15_2$, $15_5$, $15_7$ and $15_1$ comprised in the modified path list are disclosed line 42 of the FIG. 4. It has to be noted here that the modified path list preferably contains the identifier of the base station BS1 and the identifiers of base stations BS which were contained in the message received at step S350, if such identifiers were contained in the message received at step S350.

At next step S357, the processor 200 transfers the modified path list to the base station BS which manages the cell identified by the information following the first information in the modified path list, i.e. the base station BS3, which manages the cell $15_5$.

After that, the processor 200 moves to step S358, sets the first information identifying a cell managed by the base station BS in the modified path list to the second information identifying a cell managed by the base station BS. The first information identifying a cell managed by the base station BS in the modified path list is set to the information identifying the cell $15_1$.

The processor 200 then returns to step S352.

The processor 200 moves from step S352 to step S359.

At step S359, the processor 200 selects the last information identifying a cell 15 in the path list received at step S300, i.e. selects the information identifying the cell $15_8$.

At next step S360, the processor 200 sets the second information comprised in the modified path list to the information selected at step S359.

At next step S361, the processor 200 checks if the base station BS which manages the information selected at step S359 is identified in the message received at step S300 or identifies the base station BS of the processor 200.

If the base station BS which manages the information selected at step S359 is identified in the message received at step S300 or identifies its base station BS, the processor 200 moves to step S362. Otherwise, the processor 200 moves to step S363. According to the example of the line 40, as the base station BS4 is not identified in the message containing the list 40 and is not the base station BS1, the processor 200 then moves to step S362.

At step S362, the processor 200 checks if there is at least one information identifying a cell 15 which is comprised in the path list received at step S300 between the information selected as the first information and the information selected as the second information.

If there is at least one information identifying a cell 15 which is comprised in the path list received at step S300 between the information, the processor 200 moves to step S363. Otherwise, the processor 200 moves to step S365.

At step S363, the processor 200 forms the modified path list. The modified path list comprises the first information, the information comprised between the information selected as the first and the second information and the information selected as the second information. The information identifying the cells $15_1$ and $15_8$ which are comprised in the new list are disclosed line 42 of the FIG. 4. It has to be noted here that the modified path list preferably contains the identifier of the base station BS1 and the identifiers of base stations BS which were contained in the message received at step S350, if such identifiers were contained in the message received at step S350.

At next step S364, the processor 200 transfers the modified path list to the base station BS which manages the cell identified by the information following the first information in the modified path list, i.e. the base station BS4, which manages the cell $15_8$.

The processor 200 moves then to step S365, and updates the monitoring list of neighbour cells. The processor 200 considers the cell $15_8$ as a new neighbour cell of cell $15_1$. The updated monitoring list is then transmitted via the wireless interface 206 to mobile terminals.

It has to be noted here that, in a variant, the update of the monitoring list of neighbour cells is executed when the counter $N_{18}$ is upper than a predetermined value.

In another variant, the update of monitoring list of neighbour cells is executed separately from the present algorithm and uses probability of transition between cells as input. The counters $N_{ij}$ are used at step S365 to determine such probability of transition.

As example and in a non limitative way, the probability $P_{ij}$ of transition between cell $15i$ and cell $15j$ is given by $P_{ij} = (N_{ij}+N_{ji})/\text{sum\_over\_k}(N_{ik}+N_{ki})$.

The determination of the neighbour cell $15_j$ from the set of probabilities $P_{ij}$ is determined by selecting the cell $15_j$ for which the probability $P_{ij}$ is higher than a threshold, or by selecting a predetermined number of cells $15_j$ which are highest ranked in the set of probabilities $P_{ij}$.

After that, the processor 200 of the base station BS1 stops the present algorithm.

Each processor 200 of the base station BS2, BS3 and BS4 also executes the algorithm of the FIGS. 3a and 3b upon reception of the messages transferred by the base station BS1 at step S357 or S364.

Considering the base station BS2, the processor 200 of the base station BS2 detects at step S300, the reception of the message 41 in the FIG. 4 through the network interface 204.

At next step S301, the processor 200 searches, in the modified path list, information identifying at least one cell 15, the base station BS2 manages i.e. the cells $15_3$ and $15_4$.

At step S303, the processor 200 selects the first information identifying a cell 15 it manages in the modified path list, i.e. the information identifying the cell $15_3$.

The processor 200 executes the loop constituted by the steps S304 to S312 and increments the counters $N_{23}$, $N_{34}$ and $N_{42}$.

At step S351, the processor 200 sets the first information identifying a cell managed by the base station BS in another modified path list to the information $15_3$.

The processor 200 moves from step S352 to S353 and selects the other information identifying a cell managed by the base station BS comprised in the modified path list received at step S300 which is the closest from the information selected at step S351, i.e. the information identifying the cell $15_4$.

At next step S354, the processor 200 sets second information identifying a cell managed by the base station BS in the other modified path list to the information selected at step S353.

At next step S355, the processor 200 checks if there is at least one information identifying a cell 15 which is comprised in the modified path list received at step S300 between the information selected at step S351 and S353 and moves to step S358.

At step S358, the processor 200 sets the first information identifying a cell managed by the base station BS in the other modified path list to the second information identifying a cell managed by the base station BS in the other modified path list and returns to step S352.

The processor 200 moves then from step S352 to S359, selects the information identifying the cell $15_1$, sets at step S360 the second information comprised in the other modified path list to the information selected at step S359.

At step S361, the processor moves to step S362 as the base station BS1 is identified in the message received at step S300.

At step S362, the processor 200 checks if there is at least one information identifying a cell 15 which is comprised in the modified path list received at step S300 between the information selected as the first information and the information selected as the second information. According to the example of line 42, as no information is comprised in the modified path list between the information $15_4$ selected as the first information and the information $15_1$ selected as the second information, the processor 200 then moves to step S365.

At step S365, the processor 200 doesn't update the monitoring list of neighbour cells as far as there is no new cell 15 comprised in the received message.

In a variant, the processor 200 updates the probabilities of transitions between the cells $15_3$ and $15_4$ it manages and all other known cells, and determines from the new set of probabilities the new monitoring list of neighbour cells for the cells $15_3$ and $15_4$ it manages.

Considering the base station BS3, the processor 200 of the base station BS3 detects at step S300, the reception of the message 42 in the FIG. 4 through the network interface 204.

At next step S301, the processor 200 searches, in the modified path list, information identifying at least one cell 15 the base station BS3 manages i.e. the cells $15_5$ and $15_6$.

At step S303, the processor 200 selects the first information identifying a cell 15 it manages in the modified path list received at step S300, i.e. the information identifying the cell $15_5$.

The processor 200 executes the loop constituted by the steps S304 to S312 and increments the counters $N_{25}$, $N_{57}$ and $N_{71}$.

At step S351, the processor 200 sets the first information identifying a cell managed by the base station BS in another modified path list to the information identifying the cell $15_5$.

The processor 200 moves from step S352 to S359, selects the information identifying the cell $15_1$, sets at step S360 the second information comprised in the other modified path list to the information selected at step S359.

At step S361, the processor 200 moves to step S362 as the base station BS1 is identified in the message received at step S300.

At step S362, the processor 200 checks if there is at least one information identifying a cell 15 which is comprised in the modified path list received at step S300 between the information selected as the first information and the information selected as the second information. According to the example of line 43, the information identifying the cell $15_7$ is comprised in the modified path list received at step S300 between the information $15_5$ selected as the first information and the information $15_1$ selected as the second information, the processor 200 moves then to step S363.

At step S363, the processor 200 forms the other modified path list. The other modified path list comprises the information selected as the first information in the other modified path list, the information comprised in the modified path list received at step S300 between the information selected as the first and the second information in the other modified path list and the information selected as the second information in the other modified path. The information identifying the cells $15_5$, $15_7$ and $15_1$ which are comprised in the other modified path list are disclosed line 44 of the FIG. 4. It has to be noted here that the new list preferably contains the identifier of the base station BS1 and BS3.

At next step S364, the processor 200 transfers the other modified path list to the base station BS which manages the cell identified by the information following the first information in the other modified path ordered list, i.e. the base station BS4, which manages the cell $15_7$.

At step S365, the processor 200 doesn't update the monitoring list of neighbour cells as far as there is no new cell 15 comprised in the received message.

In a variant, the processor 200 updates the probabilities of transitions between the cells $15_5$ and $15_6$ it manages and all other known cells, and determines, from the new set of probabilities, new monitoring lists of neighbour cells for the cells $15_5$ and $15_6$ it manages.

Considering the base station BS4, the processor 200 of the base station BS4 detects at step S300, the reception of the message 43 in the FIG. 4 through the network interface 204.

At next step S301, the processor 200 searches, in the modified path list received at step S300, information identifying at least one cell 15 the base station BS4 manages i.e. the cells $15_7$ and $15_8$.

At step S303, the processor 200 selects the first information identifying a cell 15 it manages in the modified path list received at step S300, i.e. the information identifying the cell $15_8$.

The processor 200 executes the loop constituted by the steps S304 to S312 and increments the counter $N_{18}$.

At step S351, the processor 200 sets the first information identifying a cell managed by the base station BS in another modified path list to the information representative of the cell $15_8$.

The processor 200 moves then from step S352 to S359, selects the information identifying the cell $15_8$, sets at step S360 the second information comprised in the other modified path list to the information selected at step S359.

At step S361, the processor moves to step S362 as the base station BS4 is the base station of the processor 200.

At step S362, the processor 200 checks if there is at least one information identifying a cell 15 which is comprised in the modified path list received at step S300 between the information selected as the first information and the information selected as the second information. According to the example of line 43, as no information is comprised in the modified path list received at step S300 between the information $15_8$ selected as the first information and the information $15_8$ selected as the second information, the processor 200 moves then to step S365.

At step S365, the processor 200 updates the monitoring list of neighbour cells as far as there is a new cell $15_1$ comprised in the received message.

In a variant, the processor 200 updates the probabilities of transitions between the cells $15_7$ and $15_8$ it manages and all other known cells 15 and determines from the new set of probabilities new monitoring lists of neighbour cells for the cells $15_7$ and $15_8$ it manages.

Considering the base station BS4, the processor 200 of the base station BS4 detects at step S300, the reception of the message 44 in the FIG. 4 through the network interface 204.

At next step S301, the processor 200 searches, in the modified path list received at step S300, information identifying at least one cell 15 the base station BS4 manages, i.e. the cells $15_7$ and $15_8$.

At step S303, the processor 200 selects the first information identifying a cell 15 it manages in the modified path list received at step S300, i.e. the information identifying the cell $15_7$.

The processor 200 executes the loop constituted by the steps S304 to S312 and increments the counters $N_{57}$ and $N_{71}$.

At step S351, the processor 200 sets the first information identifying a cell managed by the base station BS in another modified path list to the information representative of the cell $15_7$.

The processor 200 moves then from step S352 to S359, selects the information identifying the cell $15_1$, sets at step S360 the second information comprised in the other modified path list to the information selected at step S359.

At step S361, the processor moves to step S362 as the base station BS1 is identified in the message received at step S300.

At step S362, the processor 200 checks if there is at least one information identifying a cell 15 which is comprised in the modified path list received at step S300 between the information selected as the first information and the information selected as the second information. According to the example of line 43, no information is comprised in the modified path list received at step S300 between the information $15_7$ selected as the first information and the information $15_1$ selected as the second information, the processor 200 moves then to step S365.

At step S365, the processor 200 doesn't update the monitoring list of neighbour cells as far as there is no new cell comprised in the received message.

In a variant, the processor 200 updates the probabilities of transitions between the cells $15_7$ and $15_8$ it manages and all other known cells 15, and determines from the new set of probabilities new monitoring lists of neighbour cells for the cells $15_7$ and $15_8$ it manages.

FIG. 5 discloses an algorithm executed by each base station according to a second mode of realisation of the present invention.

The present algorithm is executed by the processor 200 of each base station BS.

At step S500, the processor 200 detects the reception of a message through the wireless interface 206 or through the network interface 204.

The received message is a message comprising a path list composed of information, preferably ordered according to the travel of the mobile terminal 30 through the cells 15 of the wireless telecommunication network, identifying at least a part of the cells 15 that the mobile terminal 30 went through.

The path list is preferably transferred by the mobile terminal 30 to the server 20 in a Tracking Area Update message to the server 20 through the base station BS4 controlling the cell $15_8$ the mobile terminal 15 enters. The server 20 transfers the path list to the base station BS1 which manages the cell $15_1$ of which identification is ranked as the first in the path list. The path list is as the one disclosed in the line 60 of the FIG. 6.

It has to be noted here that, in a variant, the base station BS4 receives the path list from the server 20 instead of the base station BS1 or snoops the messages transferred by the mobile terminal 30 to the server 20 in order to directly obtain the path list of information identifying at least a part of the cells 15 that the mobile terminal 30 went through.

In a variant, the path list is received from a neighbour base station BS via the network interface 204.

FIG. 6 depicts the content of the messages transferred according to the second mode of realisation of the present invention.

The line 60 comprises the path list composed of ordered information identifying the cells $15_1$, $15_2$, $15_3$, $15_4$, $15_2$, $15_5$, $15_7$, $15_1$ and $15_8$ as listed in the message received at step S500.

According to the invention, the path list can also be received from another base station BS. The path list is as the one disclosed in the lines 61 to 66 of the FIG. 6.

At next step S501, the processor 200 read in the received path list, the first and second information identifying a first and a second cell 15.

According to the example of the FIG. 6, the processor 200 reads in the received path list 60, according to the order of the information in the path list, the first information identifying the cell $15_1$ and the second information identifying the cell $15_2$.

At next step S502, the processor 200 checks if the information identifying a cell 15, selected at step S501, is known, i.e. if the information identifying a cell corresponds to a known neighbour cell 15 or to a cell 15 managed by its base station BS.

If one information identifying a cell 15 is not known, the processor 200 moves to step S503. Such case occurs when a new base station BS is included in the wireless telecommunication network or when the radio wave propagation conditions are modified. Otherwise, the processor 200 moves to step S505.

At step S503, the processor 200 commands the transfer of a message to the server 20 in order to obtain the identifier of the base station BS which manages the cell 15 selected at step S304 or reads the identifier of the base station BS which manages the cell 15 selected at step S304 in the RAM memory 203 if the base station BS is already known.

At next step S504, the processor 300 memorises the identifier of the base station if it is received from the server 20 and initialises a counter $N_{ij}$ which is intended to monitor the number of time any mobile terminal 30 moves from the first cell $15_i$, to the second cell $15_j$. After that, the processor 200 moves to step S505.

At next step S505, the processor 200 increments a counter $N_{ij}$.

According to the example of the FIG. 6, the processor 200 increments the counter $N_{12}$.

At next step S506, the processor 200 deletes the first information identifying a cell 15 in the path list, i.e. deletes the information identifying the cell $15_1$. The second information identifying a cell 15 in the path list becomes then the first information identifying a cell 15 in a modified path list.

At next step S507, the processor 200 reads in the modified path list, the second information identifying a cell 15, which follows in the modified path list, the first information identifying a cell 15, i.e. reads the information identifying the cell $15_3$.

At next step S508, the processor 200 checks if the cell $15_3$, read at step S507 and identified by the second information in the modified path list is managed by its base station BS, i.e. the base station BS1.

If the cell $15_3$, read at step S507 and identified by the second information in the modified path list is managed by its base station BS, the processor 200 moves to step S509. Otherwise, the processor 200 returns to step S502 and executes the loop constituted by the step S502 to S508 as far as the second information in the modified path list is not managed by its base station BS.

At step S509, the processor 200 identifies the base station BS which manages the cell 15 identified by the second information.

At next step S510, the processor 200 commands the transfer of the modified path list to the identified base station BS. According to the example of the FIG. 1, the processor 200 commands the transfer of the modified path list comprised in the line 61 to the base station BS2.

The processor 200 moves then to step S511, and updates, if needed, the monitoring list of neighbour cells. The processor 200 considers the cell $15_8$ as a neighbour cell.

It has to be noted here that, in a variant, the update of the monitoring list of neighbour cells is executed when the counter $N_{18}$ is upper than a predetermined value.

In a variant at step S511, the processor 200 updates the probabilities of transitions between the cells $15_1$ and $15_2$ it manages and all other known cells 15, and determines from the new set of probabilities, new monitoring lists of neighbour cells for the cells $15_1$ and $15_2$ it manages.

Upon reception, of the modified path list comprised in the line 61, the processor 200 of the base station BS2 executes the present algorithm, increments the counters $N_{23}$ and $N_{34}$, deletes the first information from the modified path list, i.e. the information identifying the cell $15_2$ and later on the information identifying the cell $15_2$, and commands the transfer of another modified path list comprised in the line 62 to the base station BS1.

In a variant at step S511, the processor 200 of base station BS2 updates the probabilities of transitions between the cells $15_3$ and $15_4$ it manages and all other known cells, and determines from the new set of probabilities, new monitoring lists of neighbour cells for the cells $15_3$ and $15_4$ it manages.

Upon reception, of the modified path list comprised in the line 62, the processor 200 of the base station BS1 executes the present algorithm, increments the counter $N_{42}$, deletes the first information from the modified path list, i.e. the information identifying the cell $15_4$ and commands the transfer of another modified path list comprised in the line 63 to the base station BS3.

In a variant at step S511, the processor 200 of base station BS1 updates the probabilities of transitions between the cells $15_1$ and $15_2$ it manages and all other known cells, and determines from the new set of probabilities, new monitoring lists of neighbour cells for the cells $15_1$ and $15_2$ it manages.

Upon reception, of the modified path list comprised in the line 63, the processor 200 of the base station BS3 executes the present algorithm, increments the counter $N_{25}$, deletes the first information from the modified path list, i.e. the information identifying the cell $15_2$ and commands the transfer of another modified path list comprised in the line 64 to the base station BS4.

In a variant at step S511, the processor 200 of base station BS3 updates the probabilities of transitions between the cells $15_5$ and $15_6$ it manages and all other known cells, and determines from the new set of probabilities, new monitoring lists of neighbour cells for the cells $15_5$ and $15_6$ it manages.

Upon reception, of the modified path list comprised in the line 64, the processor 200 of the base station BS4 executes the present algorithm, increments the counter $N_{57}$, deletes the first information from the modified path list, i.e. the information identifying the cell $15_5$ and commands the transfer of another modified path list comprised in the line 65 to the base station BS1.

In a variant at step S511, the processor 200 of base station BS4 updates the probabilities of transitions between the cells $15_7$ and $15_8$ it manages and all other known cells, and determines from the new set of probabilities, new monitoring lists of neighbour cells for the cells $15_7$ and $15_8$ it manages.

Upon reception, of the modified path list comprised in the line 65, the processor 200 of the base station BS1 executes the present algorithm, increments the counter $N_{71}$, deletes the first information from the modified path list, i.e. the information identifying the cell $15_7$, updates the monitoring list of neighbour cells i.e. considers the cell $15_8$ as a neighbour cell and commands the transfer of another modified list comprised in the line 65 to the base station BS4.

It has to be noted here that, in a variant, the update of the monitoring list of neighbour cells is executed when the counter $N_{18}$ is upper than a predetermined value.

In a variant at step S511, the processor 200 of base station BS1 updates the probabilities of transitions between the cells $15_1$ and $15_2$ it manages and all other known cells, and determines from the new set of probabilities, new monitoring lists of neighbour cells for the cells $15_1$ and $15_2$ it manages.

Upon reception, of the modified path list comprised in the line 66, the processor 200 of the base station BS4 executes the present algorithm, increments the counter $N_{18}$, updates, the monitoring list of neighbour cells, deletes the first information from the modified path list and stops the present algorithm.

It has to be noted here that, in a variant, the update of the monitoring list of neighbour cells is executed when the counter $N_{18}$ is upper than a predetermined value.

In a variant at step S511, the processor 200 of base station BS4 updates the probabilities of transitions between the cells $15_7$ and $15_8$ it manages and all other known cells, and determines from the new set of probabilities, new monitoring lists of neighbour cells for the cells $15_7$ and $15_8$ it manages.

In such case the information identifying cells are reordered from the last to the first information.

Naturally, many modifications can be made to the embodiments of the invention described above without departing from the scope of the present invention.

The invention claimed is:

1. A method for updating at least one monitoring list by a first base station of a wireless telecommunication network, the at least one monitoring list comprising information identifying cells which are neighbors of a cell or cells managed by the first base station, the method comprising:
   receiving, by the first base station, a message from another base station, the message comprising a path list including information of cells a first mobile terminal has moved through;
   updating, by the first base station, the at least one monitoring list according to the received path list;
   sending, by the first base station, information related to modification of the updated monitoring list to the first mobile terminal,
   modifying, by the first base station, the received path list concerning the first mobile terminal, and
   sending, by the first base station, the modified path list to another base station.

2. The method according to claim 1, comprising:
   identifying in the path list an information identifying one cell managed by the base station;
   identifying in the path list an information identifying another cell, the information identifying the another cell directly following the information identifying the cell managed by the base station in the path list;

updating a value of a counter associated with the cell managed by the base station and the another cell; and updating the monitoring list of information identifying cells according to the value of the counter.

3. The method according to claim 1, comprising:

identifying in the path list an information identifying one cell managed by the base station;

identifying in the path list an information identifying another cell, the information identifying the another cell directly preceding the information identifying the cell managed by the base station in the path list;

updating a value of a counter associated with the cell managed by the base station and the another cell; and updating the monitoring list of information identifying cells according to the value of the counter.

4. The method according to claim 2 or 3, wherein updating the monitoring list of information identifying cells further includes updating the monitoring list according to the value of the counter when the another cell is managed by the base station.

5. The method according to claim 1, further comprising:

selecting a first information identifying a first cell managed by the base station in the received path list;

selecting a second information identifying a second cell in the received path list; and selecting each information identifying a cell between the first and second information in the receiving path list, wherein the modified path list includes the first information, each information between first and second information, and the second information.

6. The method according to claim 5, wherein the first information selected is first information, in the received path list, identifying a cell managed by the base station that is followed, in the received path list, by information identifying a cell that is not managed by the base station.

7. The method according to claim 6, wherein the second information selected is information identifying a cell of the base station that first follows, in the received path list, the first information selected.

8. The method according to claim 5, wherein plural modified path lists are determined and at least one second information selected for determining a modified path list is selected as the first information for determining a next modified path list.

9. The method according to claim 6 or 8, wherein the second information is last information of the received path list.

10. The method according to claim 1, wherein the message comprising a path list including a consecutive sequence of cells the mobile terminal has moved through is received from a base station of the wireless telecommunication network, from a server of the wireless telecommunication network, or from a mobile terminal.

11. The method according to claim 1, wherein the another base station also executes steps of the method.

12. A system comprising:

a first base station that updates at least one monitoring list of information identifying cells which are neighbors of a cell or cells managed by the first base station, the first base station including, means for receiving, from another base station, a message comprising a path list including information of cells a first mobile terminal has moved through, means for updating the at least one monitoring list according to the received path list, means for sending information related to a modification of the updated monitoring list to the first mobile terminal;

means for modifying the received path list concerning the first mobile terminal; and means for sending the modified path list to another base station.

13. A non-transitory computer readable storage medium storing computer readable instructions thereon that, when executed by an arithmetic processor, direct the arithmetic processor to execute the method according to claim 1.

14. A system comprising:

a first base station that updates at least one monitoring list comprising information identifying cells which are neighbors of a cell or cells managed by the first base station, the first base station including a memory device that stores executable instructions, a receiver that receives, from a second base station, a message comprising a path list including information of cells a first mobile terminal has moved through, and a processor configured to execute the instructions stored in the memory device in order to update the at least one monitoring list according to the received path list, send information related to modification of the updated monitoring list to the first mobile terminal, modify the received path list concerning the first mobile terminal, and send the modified path list to another base station.

* * * * *